United States Patent
Ihm et al.

(10) Patent No.: US 7,796,703 B2
(45) Date of Patent: Sep. 14, 2010

(54) METHOD OF PROCESSING RECEIVED SIGNALS IN A MULTI-INPUT MULTI-OUTPUT (MIMO) SYSTEM

(75) Inventors: Bin Chul Ihm, Anyang-si (KR); Yong Suk Jin, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 490 days.

(21) Appl. No.: 11/576,246

(22) PCT Filed: Sep. 30, 2005

(86) PCT No.: PCT/KR2005/003251

§ 371 (c)(1),
(2), (4) Date: Mar. 28, 2007

(87) PCT Pub. No.: WO2006/036052

PCT Pub. Date: Apr. 6, 2006

(65) Prior Publication Data

US 2007/0280360 A1    Dec. 6, 2007

(30) Foreign Application Priority Data

Sep. 30, 2004    (KR) .................. 10-2004-0077935

(51) Int. Cl.
*H04B 7/02* (2006.01)
*H04L 1/02* (2006.01)
*H04L 27/00* (2006.01)
*H04L 27/28* (2006.01)
*H04K 1/10* (2006.01)
*H04B 7/08* (2006.01)
*H04B 7/00* (2006.01)
*H04B 15/00* (2006.01)

(52) U.S. Cl. .................. 375/267; 375/259; 375/260; 455/132; 455/504

(58) Field of Classification Search ................ 375/259, 375/260, 267; 455/132, 504
See application file for complete search history.

(56) References Cited

U.S. PATENT DOCUMENTS

| 6,560,291 | B1 * | 5/2003 | Piret et al. ............... 375/259 |
| 6,922,445 | B1 * | 7/2005 | Sampath et al. ............ 375/267 |
| 7,327,795 | B2 * | 2/2008 | Oprea .................... 375/260 |
| 7,327,800 | B2 * | 2/2008 | Oprea et al. .............. 375/267 |

(Continued)

OTHER PUBLICATIONS

Zhang Jingmei et al: "Optimal power allocation for multiple-imput-multiple-output relaying system." In 2004 IEEE 60th Vehicular Technology Conference, 2004, Sep. 2004.
Golub, G.H. et al: "Matrix Computations." 3rd edition. John Hopkins University Press, 1996.

*Primary Examiner*—David C Payne
*Assistant Examiner*—Erin M File
(74) *Attorney, Agent, or Firm*—Lee, Hong, Degerman, Kang & Waimey

(57) ABSTRACT

A method of processing data by using a plurality of antennas and by applying weight to each signal received via a corresponding antenna in a wireless communication system is disclosed. More specifically, the method includes estimating a channel matrix corresponding to the received signal and dividing columns of the channel matrix into at least two groups. Here, each group includes at least one column. Furthermore, the method includes applying a Singular Value Decomposition (SVD) scheme to each group.

2 Claims, 2 Drawing Sheets

U.S. PATENT DOCUMENTS

| | | | |
|---|---|---|---|
| 7,577,209 B2 * | 8/2009 | Poon | 375/267 |
| 2001/0015928 A1 * | 8/2001 | Fujioka et al. | 365/203 |
| 2003/0031264 A1 * | 2/2003 | Barry et al. | 375/259 |
| 2003/0218973 A1 * | 11/2003 | Oprea et al. | 370/210 |
| 2004/0028148 A1 * | 2/2004 | Dowling | 375/296 |
| 2004/0096022 A1 * | 5/2004 | Zhang | 375/353 |
| 2004/0190636 A1 * | 9/2004 | Oprea | 375/260 |
| 2004/0192218 A1 * | 9/2004 | Oprea | 455/73 |
| 2004/0193292 A1 * | 9/2004 | Chiang et al. | 700/30 |
| 2005/0101259 A1 * | 5/2005 | Tong et al. | 455/69 |
| 2006/0067428 A1 * | 3/2006 | Poon | 375/299 |
| 2006/0098568 A1 * | 5/2006 | Oh et al. | 370/206 |
| 2007/0160156 A1 * | 7/2007 | Melzer et al. | 375/260 |
| 2007/0189151 A1 * | 8/2007 | Pan et al. | 370/210 |
| 2007/0211815 A1 * | 9/2007 | Pan et al. | 375/267 |
| 2008/0019457 A1 * | 1/2008 | Waters et al. | 375/267 |
| 2008/0037669 A1 * | 2/2008 | Pan et al. | 375/260 |
| 2008/0049709 A1 * | 2/2008 | Pan et al. | 370/344 |
| 2008/0080364 A1 * | 4/2008 | Barak et al. | 370/210 |
| 2008/0090575 A1 * | 4/2008 | Barak et al. | 455/444 |
| 2008/0108310 A1 * | 5/2008 | Tong et al. | 455/69 |
| 2008/0144733 A1 * | 6/2008 | ElGamal et al. | 375/267 |
| 2008/0165044 A1 * | 7/2008 | Kent et al. | 341/174 |
| 2008/0165868 A1 * | 7/2008 | Kent et al. | 375/260 |
| 2008/0165869 A1 * | 7/2008 | Kent et al. | 375/260 |
| 2008/0165870 A1 * | 7/2008 | Kent et al. | 375/260 |
| 2008/0192704 A1 * | 8/2008 | Kent et al. | 370/335 |
| 2008/0192852 A1 * | 8/2008 | Kent et al. | 375/262 |
| 2008/0192853 A1 * | 8/2008 | Kent et al. | 375/262 |
| 2008/0212461 A1 * | 9/2008 | Pande et al. | 370/203 |
| 2008/0219373 A1 * | 9/2008 | Zhang et al. | 375/262 |
| 2008/0219376 A1 * | 9/2008 | Qi et al. | 375/285 |
| 2008/0233965 A1 * | 9/2008 | Kent et al. | 455/450 |
| 2008/0260054 A1 * | 10/2008 | Myung et al. | 375/260 |

* cited by examiner

METHOD OF PROCESSING RECEIVED SIGNALS IN A MULTI-INPUT MULTI-OUTPUT (MIMO) SYSTEM

CROSS-REFERENCE TO RELATED APPLICATIONS

This application is the National Stage filing under 35 U.S.C. §371 of International Application No. PCT/KR2005/003251, filed Sep. 30, 2005, which claims benefit of earlier filing date and right to priority to Korean Application No. 10-2004-0077935, filed Sep. 30, 2004, the contents of which are all hereby incorporated by reference herein in their entirety.

TECHNICAL FIELD

The present invention relates to a method of processing signals, and more particularly, to a method of processing received signals in a multi-input, multi-output (MIMO) system.

BACKGROUND ART

For transmitting data in high speed, a Multi-Input, Multi-Output (MIMO) system which uses a plurality of antennas to transmit and receive data. If the number of base station antennas (M) is larger than the number of mobile station antennas (N), the amount of data that can be transmitted via the downlink MIMO channel is compared to N, and the base station (BS) transmits N number of data streams simultaneously, making it high speed transmission possible. In the MIMO system for a single user, if the BS has information on the status of the downlink channel, the BS uses a Singular Value Decomposition (SVD) scheme for beam forming to increase the amount of data that can be transmitted via a channel by the increase in Signal-to-Noise Ratio (SNR) and to achieve transmission gain from parallel data streams.

FIG. 1 is a diagram illustrating a Multi-Input, Multi-Output (MIM) system. In FIG. 1, the receiving end uses a channel matrix (H) to calculate a precoding matrix (W). The receiving end can then transmit directly the calculated W as feedback to the transmitting end. Alternatively, a multiple values corresponding to the calculated W can be defined or set in advance between the transmitting end and the receiving end. The receiving end can then send as feedback an index the pre-defined value closest or most similar to the calculated W value.

Most of the existing closed loop MIMO algorithm uses the SVD scheme. In other words, in determining W, the SVD is applied to $H^H H$ to acquire an Unitary Matrix (U), which is then used to replace W.

In addition, a signal vector (x) of the receiving end can be defined according to the following equation.

$$x = HWs + v \quad \text{[Equation 1]}$$

In Equation 1, x represents a receiving signal vector, H represents a channel matrix, W represents a precoding matrix, s represents a transmission signal vector before being precoded, and v represents white noise.

The following Equation 2 denotes the SVD scheme applied to Equation 1.

$$x = HUs + v \quad \text{[Equation 2]}$$

In Equation 2, U represents the Unitary Matrix acquired from applying the SVC to $H^H H$ ($H^H$ is a Hermitian operation of the H matrix).

Based on the characteristics of the Unitary Matrix and Equation 2, the following Equations 3-5 are formed.

$$H^H H = U \Sigma U^H \quad \text{[Equation 3]}$$

$$\Sigma = \begin{bmatrix} \sum_1^2 & 0 & 0 & 0 \\ 0 & \sum_2^2 & \cdots & 0 \\ \vdots & \vdots & \ddots & \vdots \\ 0 & 0 & \cdots & \sum_N^2 \end{bmatrix} \quad \text{[Equation 4]}$$

$$U^H U = I \quad \text{[Equation 5]}$$

At the same time, to attain a transmission signal vector s, the following equation is used.

$$s = U^H H^H x = U^H H^H H U s + U^H H^H v = \Sigma s + \Sigma^{1/2} v \quad \text{[Equation 6]}$$

As illustrated in Equation 6, the receiving end relies on the value of $$\sum_k^2$$

to restore the transmission signal s. Here, k=1, 2, ..., N and N represents a number of transmission antennas. That is, because the value of $$\sum_k^2$$

corresponds with the value of the SNR, having a large SNR means that the restoring capability of the signal is outstanding.

However, because the value of $$\sum_k^2$$

includes the status of channels corresponding to all of the transmission antennas, the values of $$\sum_k^2$$

cannot all be outstanding.

As an illustration of this point, assume that H is a 4×4 matrix. H can be represented according to the following equation.

$$H = [H_1 H_2 H_3 H_4] \quad \text{[Equation 7]}$$

In Equation 7, H is represented by four columns, and each column signifies a channel corresponding to transmission signal transmitted via a transmission antenna. If all four channels maintain orthogonal relationship with each other, there is no interference among signals transmitted via each antenna. However, in operation, it is difficult for each column to maintain orthogonality with each other column. As such, there exists interference among signals transmitted via each antenna. The rate of interference increases with a number of columns with respect to the rate of non-orthogonal relationship between each column. As discussed above, with the increase in interference, the value of $$\sum_{k}^{2}$$

decreases, and the decreased $$\sum_{k}^{2}$$

value is the reason for a small SNR, thus lowering the quality of the received signal.

DISCLOSURE OF THE INVENTION

Accordingly, the present invention is directed to a method of processing received signals in a Multi-Input, Multi-Output (MIMO) system that substantially obviates one or more problems due to limitations and disadvantages of the related art.

An object of the present invention is to provide a method of processing data by using a plurality of antennas and by applying weight to each signal received via a corresponding antenna in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method processing data includes estimating a channel matrix corresponding to the received signal and dividing columns of the channel matrix into at least two groups. Here, each group includes at least one column. Furthermore, the method includes applying a Singular Value Decomposition (SVD) scheme to each group.

In another aspect of the present invention, a method of processing data includes receiving a feedback information, where the feedback information includes at least one preceding matrix calculated from the SVD scheme applied to the group. Moreover, the method further includes transmitting a transmission signal using a preceding matrix.

Furthermore, in another aspect of the present invention, a method of processing data includes transmitting a feedback information from a receiving end, where the feedback information includes at least one precoding matrix calculated from the SVD scheme applied to the group. Moreover, the method includes receiving the feedback information, which includes the at least one preceding matrix calculated from the SVD scheme applied to the group, in a transmitting end, and transmitting a transmission signal using a preceding matrix from the transmitting end. Lastly, the method includes receiving the transmission signal having the precoding matrix applied thereto in the receiving end.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

As discussed above, H represent a channel matrix which is estimated from the signal transmitted from the transmitting end. The columns of the channel matrix are then divided into at least two groups. Here, each group consists of at least one column, and at the same time, the column of one group only belongs to one group. In other words, the column(s) of each group is different and no group shares the same column. Furthermore, in order to attain the largest Σ (or singular value), a singular value decomposition (SVD) scheme is applied to each group.

In the MIMO system, there are two methods by which feedback information related to channel status can be transmitted to the transmitting end. First method relates to directly providing the channel matrix information as feedback, and the second method relates to providing as feedback the precoding matrix information calculated from the channel matrix. More specifically, the precoding matrix is calculated from the SVD scheme applied to each group.

Figure 1:
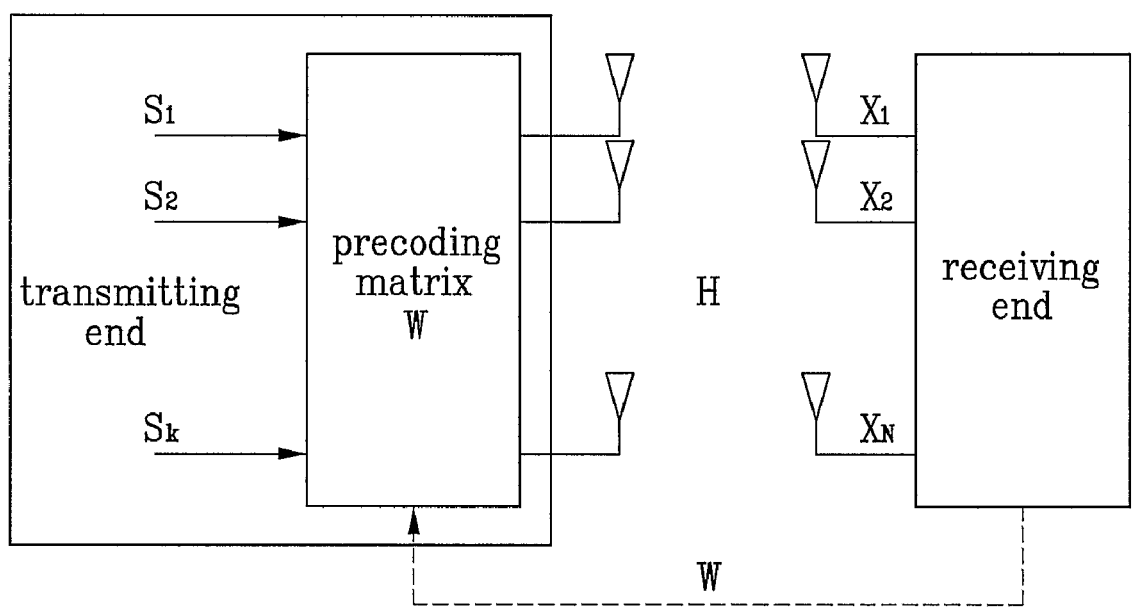
FIG. 1 is a diagram illustrating a Multi-Input, Multi-Output (MIM) system.
Figure 2:
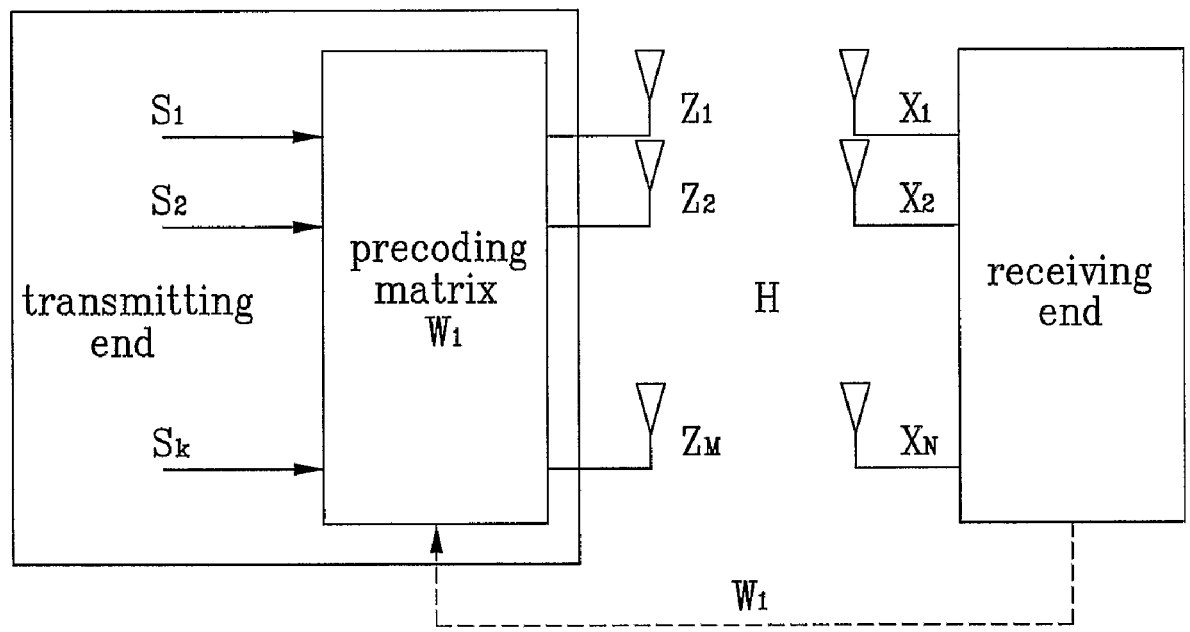
FIG. 2 is a diagram illustrating a MIMO system according to the embodiment of the present invention.

Hereafter, a method of sending as feedback the precoding matrix information according to an embodiment of the present invention will be described. FIG. 2 is a diagram illustrating a MIMO system according to the embodiment of the present invention. $W_1$ of FIG. 2 can be by the matrix of Equation 8.

$$W_1 = \begin{bmatrix} u_f & 0 \\ 0 & u_s \end{bmatrix} \quad \text{[Equation 8]}$$

After H is determined at the receiving end, $u_f$ and $u_s$ can be determined using the following Equation 9.

$$\begin{bmatrix} I & 0 \\ 0 & 0 \end{bmatrix} H^H H \begin{bmatrix} I & 0 \\ 0 & 0 \end{bmatrix} = \begin{bmatrix} u_f^H & 0 \\ 0 & 0 \end{bmatrix} \begin{bmatrix} \sum_f^2 & 0 \\ 0 & 0 \end{bmatrix} \begin{bmatrix} u_f & 0 \\ 0 & 0 \end{bmatrix} \quad \text{[Equation 9]}$$

$$\begin{bmatrix} 0 & 0 \\ 0 & I \end{bmatrix} H^T H \begin{bmatrix} 0 & 0 \\ 0 & I \end{bmatrix} = \begin{bmatrix} 0 & 0 \\ 0 & u_s^H \end{bmatrix} \begin{bmatrix} 0 & 0 \\ 0 & \sum_s^2 \end{bmatrix} \begin{bmatrix} 0 & 0 \\ 0 & u_s \end{bmatrix}$$

Here, the receiving end can send as feedback $u_f$ and $u_s$ calculated by using Equation 9 to the transmitting end. Alternatively, the receiving end can send as feedback to the transmitting end a matrix having the closest or most similar matrix from a plurality of predefined matrices. Subsequently, the transmitting end can process the received $u_f$ and $u_s$ according the following Equation 10.

$$z = \begin{bmatrix} u_f & 0 \\ 0 & u_s \end{bmatrix} s \quad \text{[Equation 10]}$$

In Equation 10, z represents a signal vector received from the transmitting antenna, and s represents a signal vector before being precoded.

The process of detecting or identifying the original signal(s) from the received signal(s) of the receiving end can be defined according to Equations 11-13. With respect to Equation 10, the received signal can be represented as shown in Equation 11.

$$x = Hz + v \quad \text{[Equation 11]}$$

At the same time, s can be represented as shown in Equation 12.

$$s = \begin{bmatrix} s_f \\ s_s \end{bmatrix} \quad \text{[Equation 12]}$$

Furthermore, $s_f$ and $s_s$ can be calculated according to Equation 13.

$$\hat{s}_f = \text{decision}\left(\begin{bmatrix} u_f^H & 0 \\ 0 & 0 \end{bmatrix} H^H x\right) \quad \text{[Equation 13]}$$

$$y = x - H \begin{bmatrix} u_f^H & 0 \\ 0 & 0 \end{bmatrix} \begin{bmatrix} \hat{s}_f \\ 0 \end{bmatrix}$$

$$\hat{s}_s = \text{decision}\left(\begin{bmatrix} 0 & 0 \\ 0 & u_s^H \end{bmatrix} H^H y\right)$$

As an embodiment of the present invention, a channel matrix H can be a 4×4 matrix. Here, if the SVD scheme is applied to all four columns, the value of $$\sum_k^2$$

is small due to interference caused by non-orthogonal relationship between too many columns.

In order to acquire a larger $$\sum_k^2$$

value, each column of the H matrix has to have orthogonal relationship with another column or reduces a number of columns by applying the SVD scheme. However, because the number of columns (e.g., four columns) are determined based on the channel status, the number of columns cannot be changed unilaterally.

As one of a method of reducing the number of columns in the matrix by applying the SVD scheme, a specified number (not all) of antennas can be used to transmit signals. Here, for example, two out of four antennas can be used to transmit signals. Another method of reducing the number of columns is by grouping specific columns and applying the SVD scheme thereto.

According to the method of using a specified number of antennas, an Adaptive Modulation and Coding (AMC) scheme can be used. Here, if the AMC scheme is not used, data throughput can fall. However, despite the benefit and the necessity of using the AMC scheme, reconstructing and/or control is complicated, and hence, the AMC scheme is difficult to use in practice.

Consequently, it may be more effective and efficient to apply the SVD scheme to the grouped columns of the matrix. The following equation, Equation 14, shows applying SVD scheme to the grouped columns.

$$\begin{bmatrix} I & 0 \\ 0 & 0 \end{bmatrix} H^H H \begin{bmatrix} I & 0 \\ 0 & 0 \end{bmatrix} = \begin{bmatrix} u_f^H & 0 \\ 0 & 0 \end{bmatrix} \begin{bmatrix} \sum_f^2 & 0 \\ 0 & 0 \end{bmatrix} \begin{bmatrix} u_f & 0 \\ 0 & 0 \end{bmatrix} \quad \text{[Equation 14]}$$

$$\begin{bmatrix} 0 & 0 \\ 0 & I \end{bmatrix} H^H H \begin{bmatrix} 0 & 0 \\ 0 & I \end{bmatrix} = \begin{bmatrix} 0 & 0 \\ 0 & u_s^H \end{bmatrix} \begin{bmatrix} 0 & 0 \\ 0 & \sum_s^2 \end{bmatrix} \begin{bmatrix} 0 & 0 \\ 0 & u_s \end{bmatrix}$$

In Equation 14, $$\sum_f^2 \text{ and } \sum_s^2$$

are represented in Equation 15.

$$\sum_f^2 = \begin{bmatrix} \sum_{f1}^2 & 0 \\ 0 & \sum_{f2}^2 \end{bmatrix}, \sum_s^2 = \begin{bmatrix} \sum_{s1}^2 & 0 \\ 0 & \sum_{s2}^2 \end{bmatrix} \quad \text{[Equation 15]}$$

$$\sum_{f1}^{2}, \sum_{f2}^{2}, \sum_{s1}^{2}, \text{ and } \sum_{s2}^{2}$$

are acquired from using two out of four columns. As a result, these values are larger than $$\sum_{k}^{2}$$

which is acquired from using all four columns.

In the receiving end, signals can be detected or identified by using methods such as Zero Forcing (ZF), Minimum Mean Square Error (MMSE), and Interference Canceling (IC).

In the embodiment of the present invention, $$\sum_{f1}^{2}, \sum_{f2}^{2}, \sum_{s1}^{2}, \text{ and } \sum_{s2}^{2}$$

change according to different combinations of the H matrix columns. As shown in Equation 16, there can be a plurality of combinations of columns. From the combination of columns, a permutation matrix having the best or largest $$\sum_{f1}^{2}, \sum_{f2}^{2}, \sum_{s1}^{2}, \text{ and } \sum_{s2}^{2}$$

can be selected or determined.

[Equation 16]

$$\begin{bmatrix} I & 0 \\ 0 & 0 \end{bmatrix} P^H P^H H P \begin{bmatrix} I & 0 \\ 0 & 0 \end{bmatrix} = \begin{bmatrix} u_f^H & 0 \\ 0 & 0 \end{bmatrix} \begin{bmatrix} \sum_{f}^{2} & 0 \\ 0 & 0 \end{bmatrix} \begin{bmatrix} u_f & 0 \\ 0 & 0 \end{bmatrix}$$

$$\begin{bmatrix} 0 & 0 \\ 0 & I \end{bmatrix} P^H P^H H P \begin{bmatrix} 0 & 0 \\ 0 & I \end{bmatrix} = \begin{bmatrix} 0 & 0 \\ 0 & u_s^H \end{bmatrix} \begin{bmatrix} 0 & 0 \\ 0 & \sum_{s}^{2} \end{bmatrix} \begin{bmatrix} 0 & 0 \\ 0 & u_s \end{bmatrix}$$

In Equation 16, P represents a permutation matrix. If the receiving end determines or selects the permutation matrix, the permutation matrix determined at the transmitting end can be sent as feedback.

Lastly, if the information being sent as feedback from the receiving end is information of its channel matrix, the transmitting end can apply the SVD scheme to the columns of the channel matrix.

The embodiment of the present invention is not limited a channel matrix having a 4×4 matrix, but be any size (e.g., n×n).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting feedback information from a receiving end, wherein the receiving end processes signals received via a corresponding antenna by applying a weight to each of the signals in a wireless communication system, the method comprising:

estimating a channel matrix 'H' corresponding to at least one of the signals received from a transmitting end;

determining two or more sub-matrices by extracting combinations of columns from the channel matrix 'H', such that each of the two or more sub-matrices comprise a smaller number of the columns than the channel matrix 'H';

calculating at least one singular value set, wherein each of the at least one singular value set is calculated for a corresponding one of the two or more sub-matrices by applying a Singular Value Decomposition (SVD) scheme to each of the two or more sub-matrices;

selecting a permutation matrix 'P' according to the at least one singular value set based on equations defined as:

$$\begin{bmatrix} I & 0 \\ 0 & 0 \end{bmatrix} P^H P^H H P \begin{bmatrix} I & 0 \\ 0 & 0 \end{bmatrix} = \begin{bmatrix} u_f^H & 0 \\ 0 & 0 \end{bmatrix} \begin{bmatrix} \sum_{f}^{2} & 0 \\ 0 & 0 \end{bmatrix} \begin{bmatrix} u_f & 0 \\ 0 & 0 \end{bmatrix} \text{ and}$$

$$\begin{bmatrix} 0 & 0 \\ 0 & I \end{bmatrix} P^H P^H H P \begin{bmatrix} 0 & 0 \\ 0 & I \end{bmatrix} = \begin{bmatrix} 0 & 0 \\ 0 & u_s^H \end{bmatrix} \begin{bmatrix} 0 & 0 \\ 0 & \sum_{s}^{2} \end{bmatrix} \begin{bmatrix} 0 & 0 \\ 0 & u_s \end{bmatrix},$$

where the at least one singular value set comprises:

$$\sum_{f}^{2} = \begin{bmatrix} \sum_{f1}^{2} & 0 \\ 0 & \sum_{f2}^{2} \end{bmatrix}, \sum_{s}^{2} = \begin{bmatrix} \sum_{s1}^{2} & 0 \\ 0 & \sum_{s2}^{2} \end{bmatrix},$$

$$\sum_{f1}^{2}, \sum_{f2}^{2}, \sum_{s1}^{2}, \text{ and } \sum_{s2}^{2}; \text{ and}$$

transmitting the selected permutation matrix 'P' as the feedback information to the transmitting end, wherein the selected permutation matrix 'P' comprises a largest singular value set.

2. The method of claim 1, wherein the channel matrix 'H' is estimated using at least a Zero Forcing (ZF) scheme, a Minimum Mean Square Error (MMSE) scheme or an Interference Canceling (IC) scheme.

* * * * *